(12) United States Patent
Kwak et al.

(10) Patent No.: US 11,060,482 B2
(45) Date of Patent: Jul. 13, 2021

(54) LIQUID ROCKET ENGINE USING BOOSTER PUMP DRIVEN BY ELECTRIC MOTOR

(71) Applicant: KOREA AEROSPACE RESEARCH INSTITUTE, Daejeon (KR)

(72) Inventors: Hyun Duck Kwak, Daejeon (KR); Jin Han Kim, Sejong (KR); Dae Jin Kim, Daejeon (KR); Chang Ho Choi, Daejeon (KR)

(73) Assignee: KOREA AEROSPACE RESEARCH INSTITUTE, Daejeon (KR)

( * ) Notice: Subject to any disclaimer, the term of this patent is extended or adjusted under 35 U.S.C. 154(b) by 678 days.

(21) Appl. No.: 15/750,757

(22) PCT Filed: Sep. 13, 2016

(86) PCT No.: PCT/KR2016/010319
§ 371 (c)(1),
(2) Date: Feb. 6, 2018

(87) PCT Pub. No.: WO2017/048041
PCT Pub. Date: Mar. 23, 2017

(65) Prior Publication Data
US 2018/0230948 A1    Aug. 16, 2018

(30) Foreign Application Priority Data
Sep. 14, 2015   (KR) .......................... 10-2015-0129674

(51) Int. Cl.
*F02K 9/48*   (2006.01)
*F02K 9/46*   (2006.01)
*F02K 9/95*   (2006.01)

(52) U.S. Cl.
CPC .................. *F02K 9/48* (2013.01); *F02K 9/46* (2013.01); *F02K 9/95* (2013.01)

(58) Field of Classification Search
CPC . F02K 9/4648; F02K 9/95; F02K 9/46; F02K 9/48; H02K 5/20; H02K 9/19
See application file for complete search history.

(56) References Cited

U.S. PATENT DOCUMENTS 3,445,695 A * 5/1969 Schultz .................... H02K 9/19
                                                     310/58
3,681,609 A * 8/1972 Boese ...................... F01K 25/10
                                                     290/16

(Continued)

FOREIGN PATENT DOCUMENTS

EP       1 741 917 A2      1/2007
JP       2014159769        9/2014

(Continued)

OTHER PUBLICATIONS

Redmond et al., "Development of Cryogenic Electric Motors", SAE Transactions, vol. 72, SAE International, 1964, pp. 257-268. (Year: 1964).*

(Continued)

*Primary Examiner* — Lorne E Meade
(74) *Attorney, Agent, or Firm* — Burris Law, PLLC (57) ABSTRACT

The present invention relates to a liquid rocket engine using a booster pump driven by an electric motor, and more particularly, to a liquid rocket engine using a booster pump driven by an electric motor in which a booster pump is installed between a propellant tank and a propellant pump so that a requirement for an inlet pressure of the propellant pump may be met even in a state in which an internal pressure of the propellant tank is reduced, resulting in reduced amount of a propellant and reduced weight of the propellant tank, and the electric motor configured to drive the booster pump may be efficiently cooled through an oxidant, a cooling line, and the like.

10 Claims, 8 Drawing Sheets

(56) References Cited

U.S. PATENT DOCUMENTS

| | | | | |
|---|---|---|---|---|
| 3,842,333 | A | * | 10/1974 | Boese .................... F01B 17/025 |
| | | | | 322/35 |
| 3,870,942 | A | * | 3/1975 | Boese ....................... B60K 3/02 |
| | | | | 322/35 |
| 4,644,207 | A | * | 2/1987 | Catterfeld ........... F04D 13/0666 |
| | | | | 310/114 |
| 6,457,306 | B1 | * | 10/2002 | Abel ....................... B64G 1/401 |
| | | | | 417/16 |
| 7,389,636 | B2 | * | 6/2008 | Fowler ...................... F02K 9/46 |
| | | | | 60/204 |
| 7,565,795 | B1 | * | 7/2009 | Horn .......................... F02K 9/95 |
| | | | | 60/200.1 |
| 9,964,073 | B1 | * | 5/2018 | Pinera ....................... F04D 7/00 |
| 2009/0173321 | A1 | * | 7/2009 | Horn ...................... F02P 15/003 |
| | | | | 123/642 |
| 2014/0260186 | A1 | | 9/2014 | Bahn et al. |
| 2014/0283499 | A1 | * | 9/2014 | Sannino ................... F02K 9/44 |
| | | | | 60/204 |
| 2015/0354504 | A1 | | 12/2015 | Kawamata et al. |

FOREIGN PATENT DOCUMENTS

| | | |
|---|---|---|
| KR | 10-2000-0012903 A | 3/2000 |
| KR | 10 654 412 B1 | 11/2006 |
| KR | 10-2007-0005470 | 1/2007 |
| KR | 10-0925858 B1 | 11/2009 |

OTHER PUBLICATIONS

Sharar et al., "Review of Two-phase Electronics Cooling for Army Vehicle Applications", Army Research Laboratory, ARL-TR-5323, Sep. 2010, pp. 1-36. (Year: 2010).*

Dlugiewicz et al., "Permanent Magnet Synchronous Motor to Drive Propellant Pump", International Symposium on Power Electronics, Electric Drives, Automation and Motion, 2012, pp. 822-826. (Year: 2012).*

Rachov et al., "Electric Feed Systems for Liquid-Propellant Rockets", Journal of Propulsion and Power, vol. 29, No. 5, Sep.-Oct. 2013, pp. 1171-1180. (Year: 2013).*

Space Shuttle Main Engine Orientation, BC98-04, Rocketdyne Propulsion & Power, Jun. 1998, pp. 1-105. (Year: 1998).*

Supplementary European Search Report for Application No. 16846862.7-1007 / 3318745 PCT/KR2016010319, dated Feb. 18, 2019 (5 pages).

Intellectual Property Office of Korea, International Search Report for Application No. PCT/KR2016/010319 dated Dec. 23, 2016.

Intellectual Property Office of Korea, Written Opinion for Application No. PCT/KR2016/010319 dated Dec. 23, 2016.

* cited by examiner

LIQUID ROCKET ENGINE USING BOOSTER PUMP DRIVEN BY ELECTRIC MOTOR

TECHNICAL FIELD

The present invention relates to a liquid rocket engine using a booster pump driven by an electric motor, and more particularly, to a liquid rocket engine using a booster pump driven by an electric motor in which a booster pump is installed between a propellant tank and a propellant pump so that the requirement for an inlet pressure of the propellant pump may be met even in a state in which an internal pressure of the propellant tank is reduced, resulting in reduced weight of the propellant tank, and the electric motor configured to drive the booster pump may be efficiently cooled through a propellant, a cooling line, and the like.

BACKGROUND ART

Generally, turbopump type engines for rockets using a liquid propellant send an oxidant and a fuel at a high pressure to a main combustor by using a high-temperature gas generated from a gas generator, thereby generating thrust.

Figure 4:
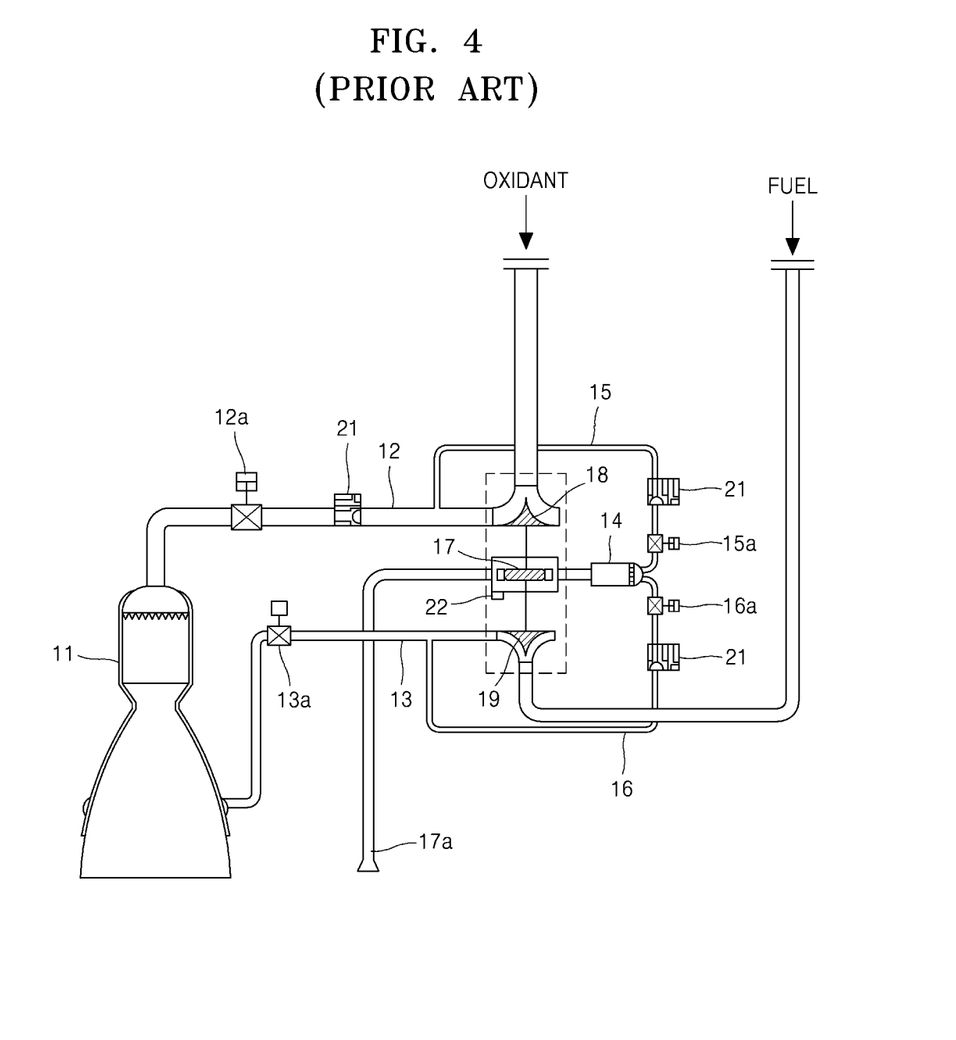
FIGS. 4 and 5 are structural views illustrating structures of conventional liquid rocket engines.

As illustrated in FIG. 4, a turbopump type engine for a rocket which uses a liquid propellant includes a main combustor 11 to combust an oxidant and a fuel, a main oxidant line 12 to guide an oxidant to the main combustor 11, a main fuel line 13 to guide a fuel to the main combustor 11, a gas generator 14 to generate a high-temperature and high-pressure gas, an auxiliary oxidant line 15 to guide a part of the oxidant to the gas generator 14, an auxiliary fuel line 16 to guide a part of the fuel to the gas generator 14, a turbine 17 to be rotated by the high-temperature and high-pressure gas of the gas generator 14, and an oxidant pump 18 and a fuel pump 19 that are coupled uniaxially to the turbine 17.

In addition, as illustrated in FIG. 4, the turbopump type engine for a rocket which uses a liquid propellant includes a main oxidant opening/closing valve 12a to turn on/off the oxidant guided to the main combustor 11, a main fuel opening/closing valve 13a to turn on/off the fuel guided to the main combustor 11, an auxiliary oxidant opening/closing valve 15a to turn on/off the oxidant guided to the gas generator 14, an auxiliary fuel opening/closing valve 16a to turn on/off the fuel guided to the gas generator 14, and a gas discharge pipe 17a to discharge gas passed through the turbine 17 to the outside. Reference numeral "21", which has not yet been described, denotes correction valves or orifices to correct a thrust error, and reference numeral "22" denotes a pyro starter or a turbine starter.

Hereinafter, a process of starting the turbopump type engine for a rocket which uses a liquid propellant will be described with reference to FIG. 4.

First, the turbine 17 is driven by the turbine starter 22 to increase a pressure via the oxidant pump 18 and the fuel pump 19. In this state, the auxiliary oxidant valve 15a and the auxiliary fuel valve 16a are opened to supply an oxidant and a fuel (hereinafter, referred to as "propellant") to the gas generator 14. The supplied propellant is combusted in the gas generator 14 to generate a combustion gas, and the turbine 17 is driven again by a high-temperature combustion gas to rotate the oxidant pump 18 and the fuel pump 19 (hereinafter, collectively referred to as "pumps"). Subsequently, the gas generator 14 is driven to open the main oxidant valve 12a and the main fuel valve 13a (hereinafter, collectively referred to as "main valves") when the pumps 18 and 19 produce a certain degree of pressure to supply the propellant to the main combustor 11. The supplied propellant is combusted in the main combustor 11 to be discharged as a high-temperature gas via nozzles to the outside. The turbopump type engine is started through these processes.

However, in the liquid rocket engine including a turbine and a gas generator, a propellant supplied to inlets of an oxidant pump and a fuel pump must be maintained at a certain degree or higher of pressure to suppress the occurrence of cavitation inside each pump. For this, the oxidant tank and the fuel tank must maintain a certain degree or greater of internal pressure, and be designed to have a specific thickness or more to sustain the internal pressure. Thus, the weight of a propellant tank is increased in a projectile.

Figure 5:
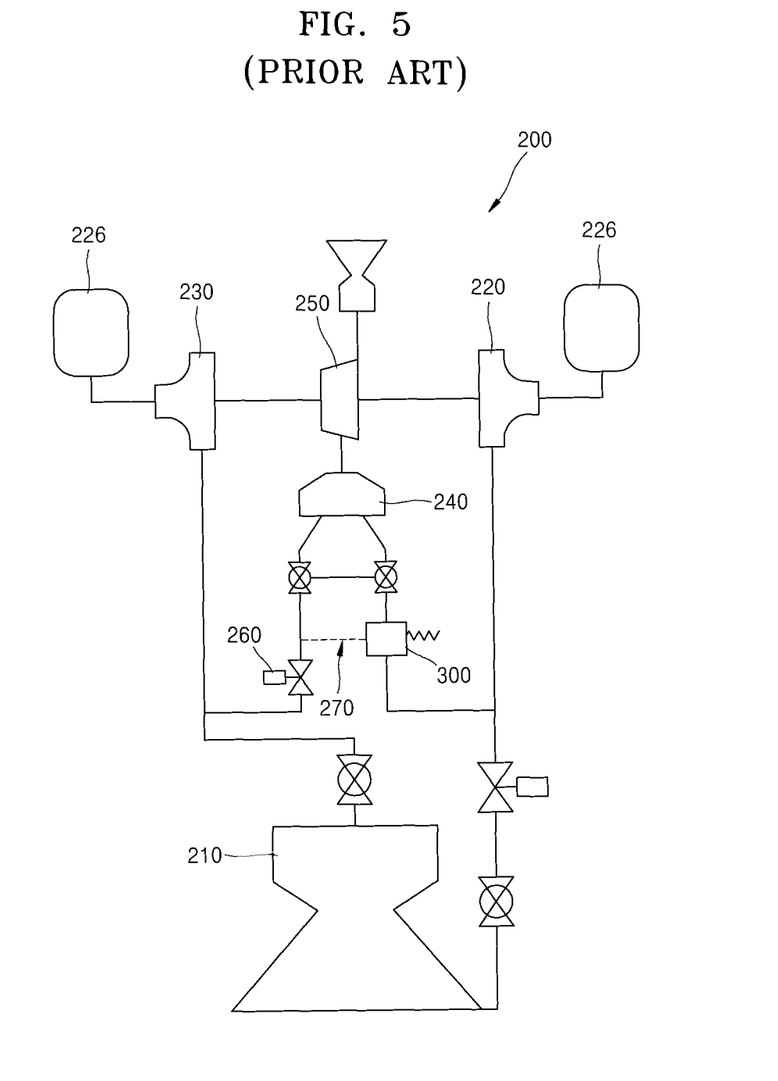

To address these problems, Korean Patent Application Registration No. 10-0654412 discloses a liquid propellant rocket engine 200 including, as illustrated in FIG. 5: a combustion chamber 210; a fuel supply pump 220 to supply a fuel to the combustion chamber; an oxidant supply pump 230 to supply an oxidant to the combustion chamber; a gas generator 240 to partially receive the fuel and the oxidant supplied from the fuel supply pump and the oxidant supply pump to generate a gas; a turbine 250 to rotate by receiving the gas generated from the gas generator and drive the fuel supply pump and the oxidant supply pump; a thrust control valve 260 to adjust the amount of the oxidant supplied to the gas generator; an oxidant bypass pipe 270 branched from the thrust control valve on the side of the gas generator; and a mixing ratio stabilizer 300 to control the fuel supplied to the gas generator according to a pressure of the oxidant supplied to the oxidant bypass pipe, wherein the liquid propellant rocket engine 200 is configured such that respective liquids flow from a fuel booster pump 226 and an oxidant booster pump 236 to store the oxidant.

Generally, booster pumps are driven using a hydraulic turbine, and to drive the hydraulic turbine, a part of a high-pressure propellant is bypassed at an outlet of each of a plurality of propellant pumps to be used as a driving source. In this case, a system becomes complicated and an additional pump efficiency loss occurs.

In addition, there is a need to develop a configuration capable of stably driving each booster pump disclosed in the above-registered patent application.

DETAILED DESCRIPTION OF THE INVENTION

Technical Problem

To address the problems described above, an object of the present invention is to provide a liquid rocket engine in which a booster pump driven by an electric motor is installed, and the electric motor is cooled by a propellant.

In addition, a particular object of the present invention is to provide a liquid rocket engine in which a booster pump is installed between a propellant tank and a propellant pump so that a requirement for an inlet pressure of the propellant pump may be met even in a state in which an internal pressure of the propellant tank is reduced, resulting in reduced weight of the propellant tank, and the electric motor configured to drive the booster pump may be efficiently cooled through an oxidant, a cooling line, and the like.

Technical Solution

In accordant with one aspect of the present invention, provided is a liquid rocket engine using a booster pump driven by an electric motor, including: a main combustor to receive and combust an oxidant and a fuel; a main oxidant line to guide the oxidant accommodated in an oxidant tank to the main combustor; a main fuel line to guide the fuel accommodated in a fuel tank to the main combustor; an oxidant pump positioned at the main oxidant line; a fuel pump positioned at the main fuel line; an oxidant booster pump installed at the main oxidant line between the oxidant tank and the oxidant pump; a fuel booster pump installed at the main fuel line between the fuel tank and the fuel pump; an electric motor positioned between the oxidant booster pump and the fuel booster pump with an interval therebetween and driving the oxidant booster pump and the fuel booster pump; a cooling line branched from a side of the main oxidant line to guide a part of the oxidant to the electric motor, or branched from a side of the main fuel line to guide a part of the fuel to the electric motor; a cooler connected to the cooling line so as to allow fluid flow therebetween and installed at the electric motor; and a condenser installed at the cooling line, wherein at least one of the oxidant and the fuel is transferred to the cooling line to cool the electric motor.

Advantageous Effects of the Invention

A liquid rocket engine using a booster pump driven by an electric motor according to the present invention having the above-described structure includes a booster pump driven by an electric motor, and has an effect of cooling the electric motor using a propellant.

In addition, in the liquid rocket engine using a booster pump driven by an electric motor according to the present invention, a booster pump is installed between a propellant tank and a propellant pump so that a requirement for an inlet pressure of the propellant pump may be met even in a state in which an internal pressure of the propellant tank is reduced, resulting in reduced weight of the propellant tank, and an electric motor configured to drive the booster pump may be efficiently cooled through an oxidant, a cooling line, and the like.

BEST MODE

An embodiment of the present invention provides a liquid rocket engine using a pump driven by an electric motor, the liquid rocket engine including: a main combustor to receive and combust an oxidant and a fuel; a main oxidant line to guide the oxidant accommodated in an oxidant tank to the main combustor; a main fuel line to guide the fuel accommodated in a fuel tank to the main combustor; an oxidant pump positioned at the main oxidant line; a fuel pump positioned at the main fuel line; an oxidant booster pump installed at the main oxidant line between the oxidant tank and the oxidant pump; a fuel booster pump installed at the main fuel line between the fuel tank and the fuel pump; an electric motor positioned between the oxidant booster pump and the fuel booster pump with an interval therebetween and driving the oxidant booster pump and the fuel booster pump; a cooling line branched from a side of the main oxidant line to guide a part of the oxidant to the electric motor, or branched from a side of the main fuel line to guide a part of the fuel to the electric motor; a cooler connected to the cooling line so as to allow fluid flow therebetween and installed at the electric motor; and a condenser installed at the cooling line, in which at least one of the oxidant and the fuel is transferred to the cooling line to cool the electric motor.

In addition, the liquid rocket engine may further include a gas generator to generate a high-temperature and high-pressure gas; an auxiliary oxidant line branched between the main combustor and the oxidant pump to guide a part of the oxidant to the gas generator; an auxiliary fuel line branched between the main combustor and the fuel pump to guide a part of the fuel to the gas generator; and a turbine configured to be rotated by the high-temperature and high-pressure gas generated by the gas generator and drive the oxidant pump and the fuel pump.

In addition, an end of the cooling line may be branched between the oxidant pump and the oxidant booster pump, and another end thereof may be connected between the oxidant booster pump and the oxidant tank.

In addition, an end of the cooling line may be branched between the fuel pump and the fuel booster pump, and another end thereof may be connected between the fuel booster pump and the fuel tank.

In addition, an end of the cooling line is connected to the oxidant pump and another end thereof is exposed to the outside, and thus the oxidant leaked from the oxidant pump may be heat-exchanged with the electric motor and discharged to the outside.

In addition, an end of the cooling line may be branched between the main combustor and the oxidant pump, and another end thereof may be connected between the oxidant tank and the oxidant pump.

In addition, an end of the cooling line may be branched between the main combustor and the fuel pump, and another end thereof may be connected between the fuel tank and the fuel pump.

In addition, the cooler may have a barrel shape to accommodate the electric motor and have a flow path therein.

In addition, the cooler may have a coil shape wound on an outer circumferential surface of the electric motor, and be connected to the end of the cooling line and the other end of the cooling line.

In addition, the electric motor may uniaxially connect the oxidant booster pump and the fuel booster pump to each other.

In addition, a pair of electric motors may be configured to be respectively connected to the oxidant booster pump and the fuel booster pump.

In addition, the liquid rocket engine may further include a battery connected to a side of the cooling line and configured to supply power to the electric motor, wherein the cooling line guides the oxidant or the fuel to the battery, and the cooler may be installed at the battery.

In addition, the liquid rocket engine may further include an igniter connected to the battery, and installed at a side of the main combustor to ignite the main combustor by electric spark.

In addition, at least one of the oxidant and the fuel may pass through the cooler and then be condensed in the condenser.

MODE OF THE INVENTION

Hereinafter, example embodiments of the present invention will be described in detail with reference to the accompanying drawings and the following description. However, the present invention should not be construed as being limited to embodiments set forth herein and may be embodied in different forms. Rather, these embodiments are provided so that this disclosure will be thorough and complete, and will fully convey the scope of the invention to those skilled in the art.

In addition, in the description of the present invention, like reference numerals denote like constitutional elements, and thus detailed descriptions thereof will be provided once.

Figure 1A:
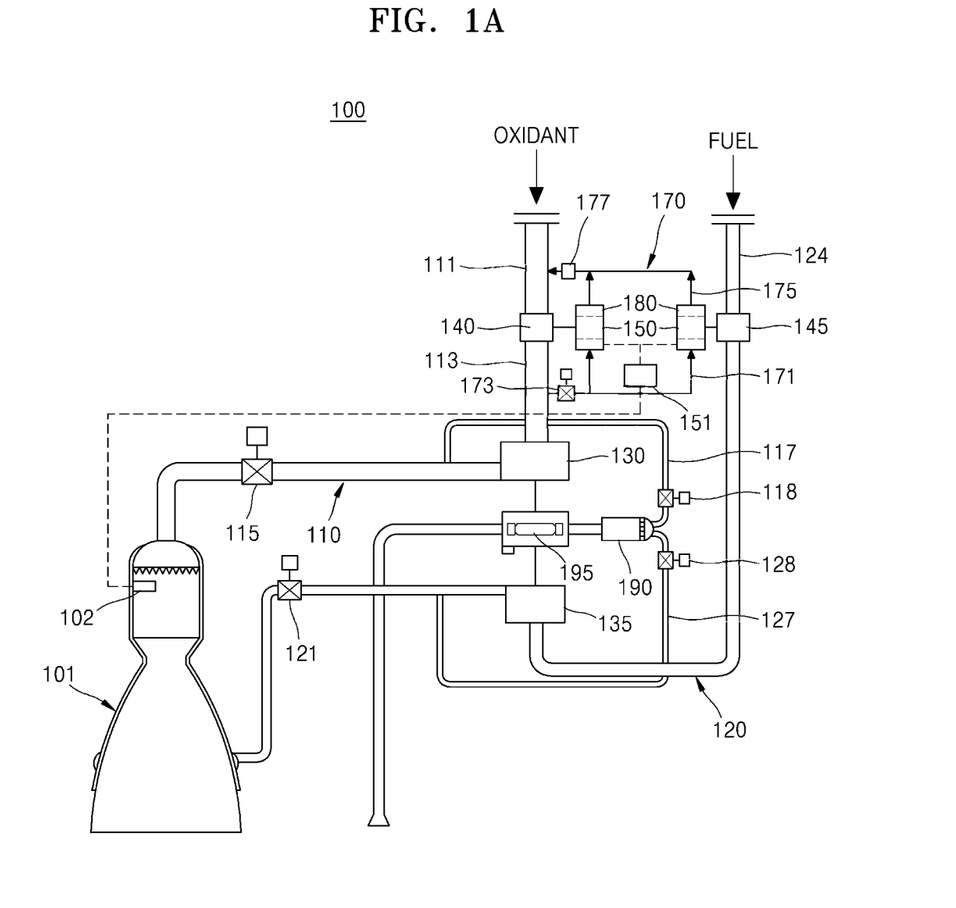
FIGS. 1A and 1B are conceptual views respectively illustrating structures of liquid rocket engines using a booster pump driven by an electric motor, according to an embodiment and a modified embodiment of the present invention.
Figure 1B:
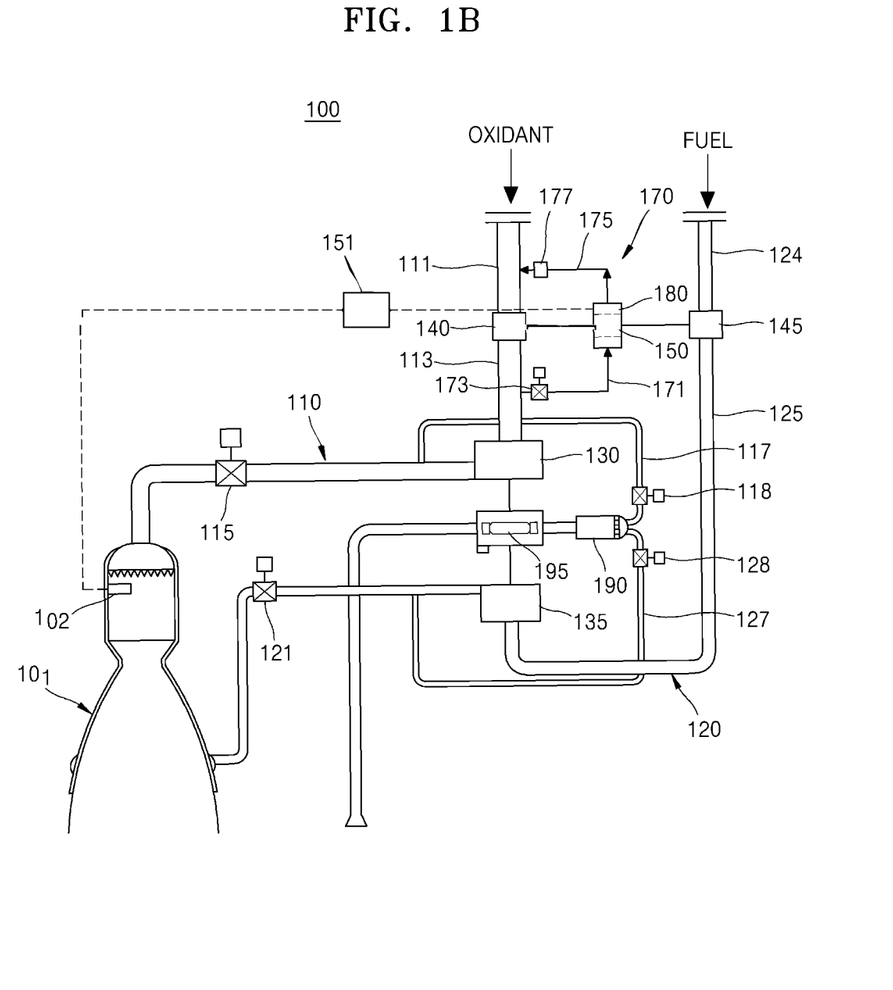
Figure 1C:
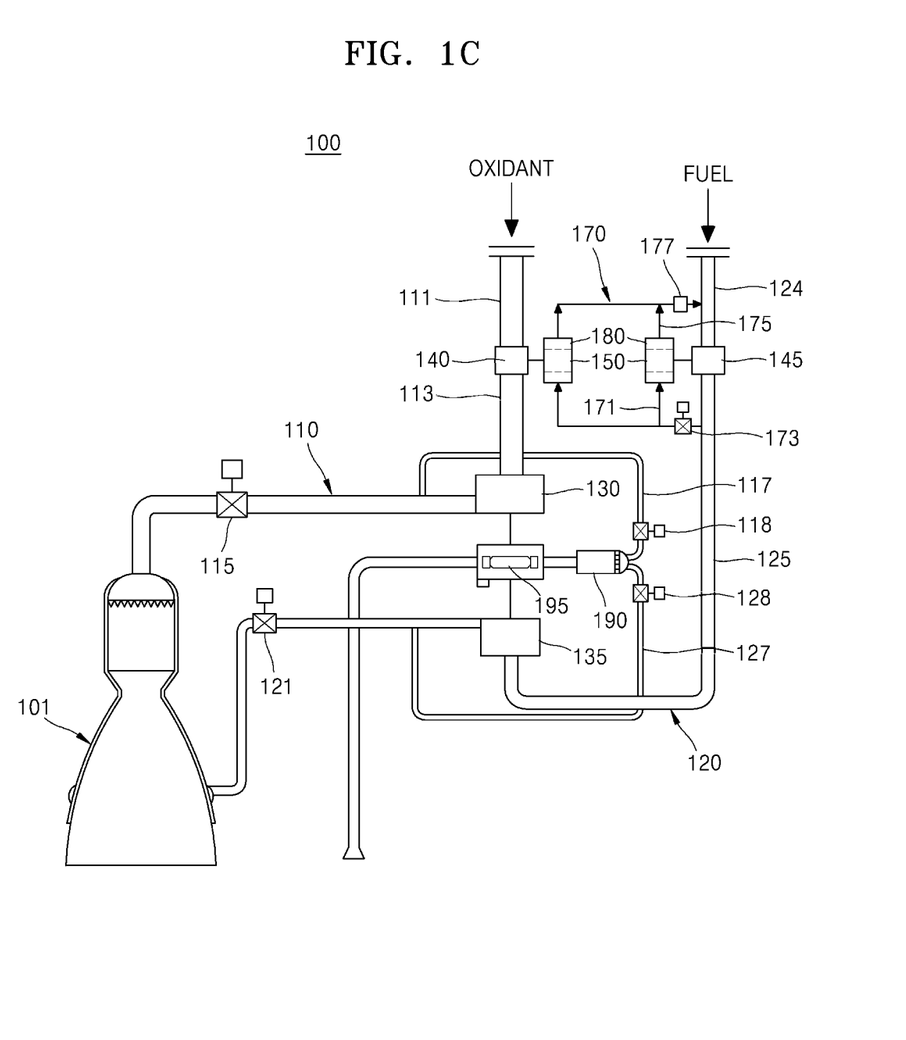
FIGS. 1C to 1E are conceptual views illustrating structures of liquid rocket engines according to other embodiments of the present invention.
Figure 1D:
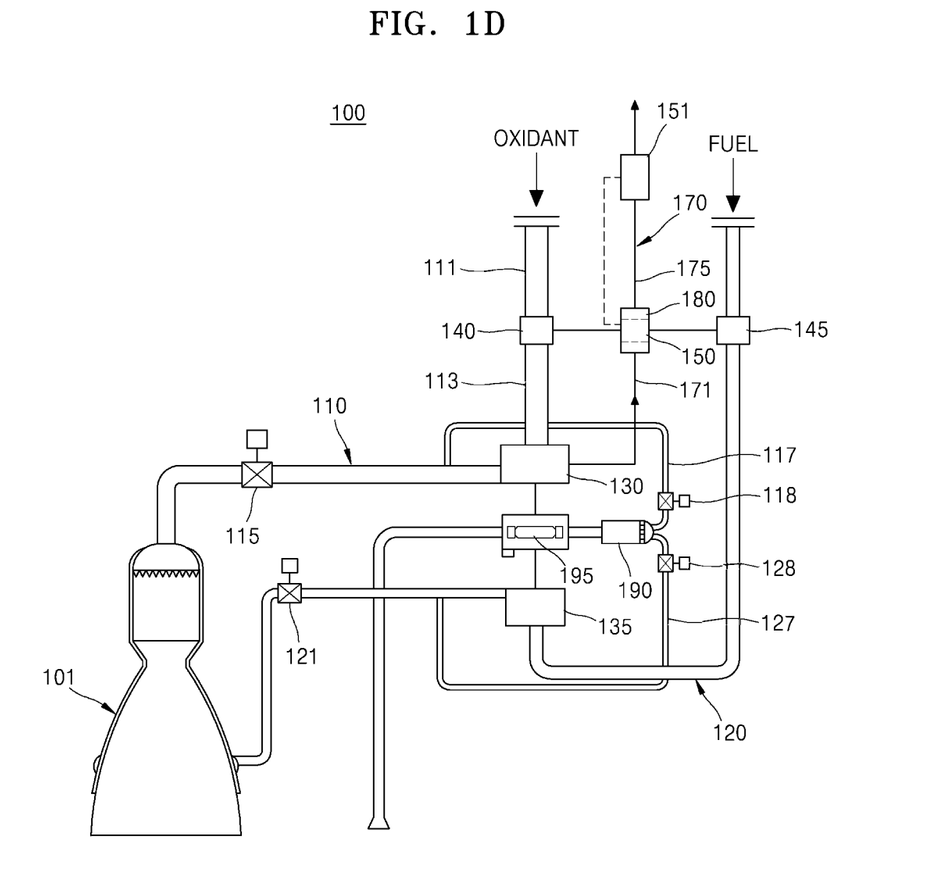
Figure 1E:
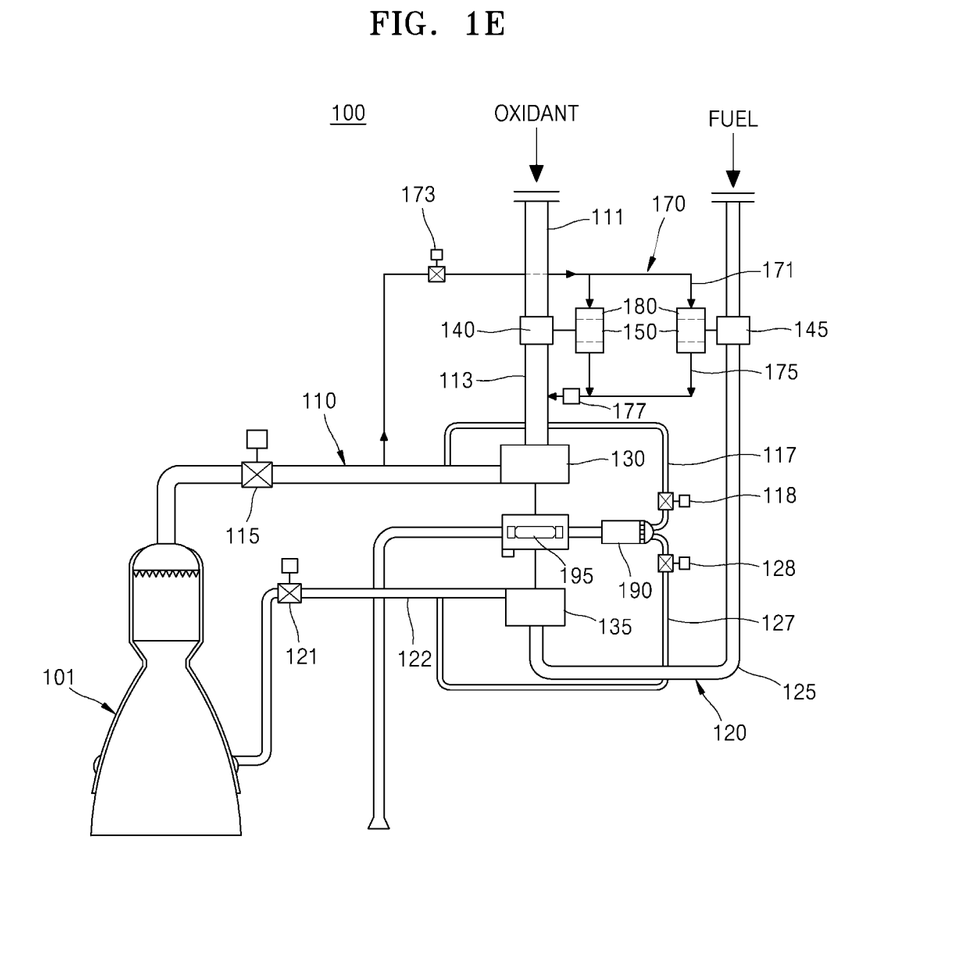
Figure 2:
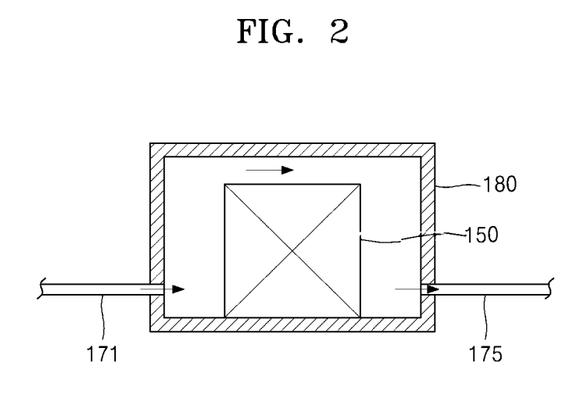
FIG. 2 is a longitudinal sectional view illustrating a structure of an electric motor casing for cooling according to the present invention.

FIGS. 1A and 1B are conceptual views respectively illustrating structures of liquid rocket engines 100 using a booster pump driven by an electric motor, according to an embodiment and a modified embodiment of the present invention. FIGS. 1C to 1E are conceptual views illustrating structures of liquid rocket engines 100 according to other embodiments of the present invention. FIG. 2 is a longitudinal sectional view illustrating a structure of an electric motor casing for cooling according to the present invention.

Referring to FIGS. 1A and 1B, the liquid rocket engine 100 using a booster pump driven by an electric motor according to the present invention is configured such that an oxidant booster pump and a fuel booster pump are respectively installed on inlet sides of an oxidant pump and a fuel pump, and thus the liquid rocket engine 100 can be operated even in a state in which internal pressures of the oxidant tank and the fuel tank are low.

In addition, the liquid rocket engine 100 further includes a cooling line and a cooler to cool an electric motor.

Specifically, the liquid rocket engine 100 using a booster pump driven by an electric motor according to the present invention includes a main combustor 101 to receive and combust an oxidant and a fuel, a main oxidant line 110 to guide the oxidant accommodated in an oxidant tank to the main combustor 101, a main fuel line 120 to guide the fuel accommodated in a fuel tank to the main combustor, an oxidant pump 130 and a fuel pump 135 that are respectively installed at the main oxidant line 110 and the main fuel line 120, an oxidant booster pump 140 installed at the main oxidant line 110 to supply the oxidant to the oxidant pump 130, a fuel booster pump 145 installed at the main fuel line 120 to supply the fuel to the fuel pump 135, an electric motor 150 configured to drive the oxidant booster pump 140 and the fuel booster pump 145, a battery 151 configured to supply power to the electric motor 150, a cooling line 170, and a cooler.

The oxidant booster pump 140 and the fuel booster pump 145 that are driven by electric power are operated even at a much lower inlet pressure than that required in the oxidant pump 130 and the fuel pump 135 that are driven by a turbine 195, and thus the weight of a projectile may be reduced by decreasing internal pressures of the oxidant tank and the fuel tank and relatively thinning the thicknesses of the tanks.

In addition, the liquid rocket engine 100 includes a gas generator 190 to generate a high-temperature and high-pressure gas, an auxiliary oxidant line 117 to guide a part of the oxidant to the gas generator 190, an auxiliary fuel line 127 to guide a part of the fuel to the gas generator 190, and a turbine 195 configured to be rotated by the high-temperature and high-pressure gas of the gas generator 190 to drive the oxidant pump 130 and the fuel pump 135.

In addition, the liquid rocket engine 100 includes a main oxidant opening/closing valve 115 to turn on/off the oxidant guided to the main combustor 101, a main fuel opening/closing valve 121 to turn on/off the fuel guided to the main combustor 101, an auxiliary oxidant opening/closing valve 118 to turn on/off the oxidant guided to the gas generator 190, and an auxiliary fuel opening/closing valve 128 to turn on/off the fuel guided to the gas generator 190.

A process of operating the liquid rocket engine using a booster pump driven by an electric motor according to the present invention will now be described. When driving the oxidant booster pump 140, the fuel booster pump 145, the oxidant pump 130, and the fuel pump 135, all the pumps may be simultaneously driven, or the oxidant booster pump 140 and the fuel booster pump 145 are first driven.

In this state, the auxiliary oxidant valve 118 and the auxiliary fuel valve 128 are opened to supply the oxidant and the fuel to the gas generator, a supplied propellant (the oxidant and the fuel) is combusted in the gas generator, a generated high-temperature and high-pressure combustion gas drives again the turbine to rotate the oxidant pump 130 and the fuel pump 135.

Subsequently, when the propellant is supplied to the main combustor 101 by opening the main oxidant opening/closing valve 115 and the main fuel opening/closing valve 121, the propellant is combusted in the main combustor 101 and a generated high-temperature gas is discharged to the outside.

At this time, the electric motor 150 to drive the oxidant booster pump 140 and the fuel booster pump 145 is overheated while being continuously driven, and thus to cool the overheated electric motor 150, the cooling line 170 and the cooler, which have been described above, are configured.

The cooling line 170 is connected to a side of the main oxidant line 110 so as to allow fluid flow therebetween and guides a part of the oxidant to the electric motor 150, and may include a supply unit 171 to supply the oxidant to the cooler, and a discharge unit 175 to guide the oxidant discharged from the cooler.

The supply unit 171 may be configured such that a cooling line opening/closing valve 173 is installed to supply the oxidant only when the electric motor 150 is overheated, or an opening/closing valve is omitted and a cooling operation is performed all the time.

The cooler is configured to cool the electric motor 150 by the oxidant supplied via the cooling line 170, and, as illustrated in FIG. 2, may be an electric motor casing 180 for cooling having a barrel shape to accommodate the electric motor 150, and a flow path (not shown) may be formed in the casing 180.

Meanwhile, the main oxidant line 110 includes, with respect to the oxidant booster pump 140, a booster pump inlet-side oxidant line portion 111 connected to the oxidant tank, and a booster pump outlet-side oxidant line portion 113 connected to the oxidant pump 130.

In this regard, the supply unit 171 may be connected to the booster pump outlet-side oxidant line portion 113, and the discharge unit 175 may be connected to the booster pump inlet-side oxidant line portion 111.

The oxidant may be liquefied oxygen, and is present as a liquid in the main oxidant line 110, but diffuses into the electric motor casing 180 for cooling at the supply unit and is vaporized while being heated by contact with the electric motor 150.

In addition, the vaporized oxidant is converted back into a liquefied form through the condenser 177 installed at the discharge unit 175 and introduced into the booster pump inlet-side oxidant line portion 111, and, through this process, the oxidant cools the electric motor 150.

Meanwhile, as illustrated in FIG. 1A, the electric motor may be a pair of uniaxial electric motors respectively connected to the oxidant booster pump 140 and the fuel booster pump 145, or, as illustrated in FIG. 1B, may be a single biaxial electric motor that uniaxially connects the oxidant booster pump 140 and the fuel booster pump 145.

As such, the oxidant supplied to the electric motor casing 180 for cooling to cool the electric motor 150 is introduced back into the main oxidant line, and thus a liquid rocket engine system may operate without oxidant loss.

To ignite the main combustor 101, an igniter 102 may be installed on a side of the main combustor 101. The igniter 102 is driven in an electric spark manner, and may receive a driving source from the battery 151. The battery 151 may transmit a driving force to the electric motor 150, and may be spaced apart from or positioned adjacent to the electric motor 150.

A conventional liquid rocket engine can be ignited using a TEAL cartridge. When a fuel flows into the TEAL cartridge, an internal pressure thereof increases, and then, when oxygen is introduced thereinto, spontaneous ignition occurs. The generated flame travels to a main combustor and, as a result, the liquid rocket engine is ignited.

According to a conventional ignition method, the number of engine ignition events is limited. When the engine needs to be restarted, a TEAL cartridge is required in accordance with the number of times of use. In addition, the TEAL cartridge is in the form of aluminum powder, and thus there is a possibility of explosion in handling, and a control valve must be further installed to control the TEAL cartridge.

However, the liquid rocket engine 100 according to an embodiment of the present invention is ignited using electric spark, and thus may have improved stability. In addition, the igniter 102 may receive energy from the battery 151 configured to drive the electric motor 150, and thus system volume and weight may be reduced. In addition, since the igniter 102 continuously receives an energy source from the battery 151, the engine may be reignited without installation of an additional cartridge, or the like.

Meanwhile, referring to FIG. 1C, a second embodiment of the present invention differs from the above-described first embodiment in that a fuel is used as a coolant for cooling an electric motor or the like, instead of using an oxidant.

Thus, a cooling line consists of the supply unit 171 to supply the fuel to the cooler, e.g., the electric motor casing 180 for cooling, and the discharge unit 175 to guide the fuel discharged from the cooler.

In addition, the main fuel line 120 includes, with respect to the fuel booster pump 145, a booster pump inlet-side fuel line portion 124 connected to the oxidant tank, and a booster pump outlet-side fuel line portion 125 connected to the fuel pump 135.

In this regard, the supply unit 171 is connected to the booster pump outlet-side fuel line portion 125, and the discharge unit 175 is connected to the booster pump inlet-side fuel line portion 124.

Meanwhile, referring to FIG. 1D, a third embodiment of the present invention is the same as the above-described first embodiment in that an oxidant is used as a coolant for cooling an electric motor or the like, but differs therefrom in that the oxidant used in cooling is discharged to the outside, instead of being bypassed.

For this, a side of the supply unit 171 of a cooling line is connected to the oxidant pump 130 and another side thereof is connected to the cooler, in particular, the casing 180, and thus the oxidant is supplied to the casing 180, and a side of the discharge unit 175 is connected to the casing 180 and another thereof is exposed to the outside, and thus the oxidant is guided to be discharged to the outside.

In this regard, a reason why the side of the supply unit 171 is connected to the oxidant pump 130 is that, when the liquid rocket engine is operated, the oxidant is necessarily leaked from a side of the oxidant pump, but, through such a configuration, the leaked oxidant is used to cool an electric motor or the like and then discharged to the outside, instead of directly discharging the leaked oxidant to the outside.

Meanwhile, the cooling line may also be used to cool the battery 151 as well as the electric motor 150.

Meanwhile, referring to FIG. 1E, a fourth embodiment of the present invention is the same as the above-described first and second embodiments in that an electric motor or a battery is cooled by bypassing an oxidant, but differs therefrom in that the supply unit 171 is connected to an outlet-side main oxidant line portion 110 connected to the main combustor 101 with respect to the oxidant pump 130, and the discharge unit 175 is connected to the booster pump outlet-side oxidant line portion 113.

In addition, although not shown in the drawings, a fuel as well as an oxidant may be configured to perform a cooling operation by being bypassed. In this regard, a fuel may also be configured to be bypassed such that the supply unit 171 is connected to an outlet-side main fuel line portion 122 connected to the main combustor 101 with respect to the fuel pump 135, and the discharge unit 175 is connected to an inlet-side main fuel line portion 124 to allow fluid flow therebetween.

Figure 3:
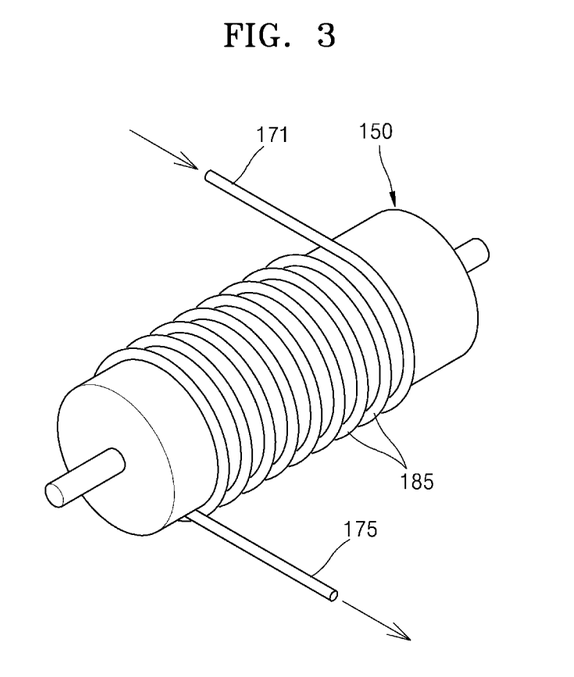
FIG. 3 is a view illustrating a cooler of the present invention having a different structure from that of FIG. 2.

FIG. 3 is a view illustrating a cooler of the present invention having a different structure from that of FIG. 2.

Referring to FIG. 3, unlike the above-described embodiments, in the present embodiment, the cooler is wound on an outer circumferential surface of the electric motor 150, and is configured as a coil-shaped cooling pipe 185 having an end connected to the supply unit 171 so as to allow fluid flow therebetween and another end connected to the discharge unit 175 so as to allow fluid flow therebetween.

In addition, the cooling pipe 185 has the same diameter as that of the supply unit 171 and the discharge unit 175, and thus allows a liquid oxidant as a coolant to be circulated therethrough without being vaporized.

The above-described embodiments of the present invention are provided for illustrative purposes only, and it will be understood by those of ordinary skill in the art to which the present invention pertains that various changes and other equivalent embodiments may be made therefrom. Thus, it will be understood that embodiments mentioned in the detailed description are not intended to limit the scope of the present invention. Therefore, the true scope of the present invention should be defined by the spirt of the appended claims. In addition, it is to be understood that the present invention includes all modifications, equivalents, and substitutes within the spirt and scope of the present invention as defined by the appended claims.

INDUSTRIAL APPLICABILITY

According to an embodiment of the present invention, a liquid rocket engine, in which the amount of a used propellant may be reduced, and an overheated electric motor may be efficiently cooled by circulating the propellant, is provided, and embodiments of the present invention may be applied to rocket engines, propulsion devices, aerospace equipment, and the like that use an industrially applicable liquid rocket engine.

The invention claimed is:

1. A liquid rocket engine comprising:
a main combustor to receive and combust an oxidant and a fuel;
a main oxidant line to guide the oxidant accommodated in an oxidant tank to the main combustor;
a main fuel line to guide the fuel accommodated in a fuel tank to the main combustor;
an oxidant pump installed at the main oxidant line;
a fuel pump installed at the main fuel line;
an oxidant booster pump installed at the main oxidant line between the oxidant tank and the oxidant pump;
a fuel booster pump installed at the main fuel line between the fuel tank and the fuel pump;
a biaxial electric motor installed between the oxidant booster pump and the fuel booster pump with an interval therebetween, the biaxial electric motor uniaxially connected to the oxidant booster pump and the fuel booster pump to drive the oxidant booster pump and the fuel booster pump;
a cooling line having a supply unit connected to the oxidant pump at a first end of the supply unit to guide oxidant leaked from the oxidant pump to said biaxial electric motor;
a cooler connected to a second end of the supply unit so as to allow leaked oxidant from the oxidant pump to flow to the cooler installed at said biaxial electric motor;
a cooling line opening/closing valve installed in the cooling line to supply the leaked oxidant to said biaxial electric motor when said biaxial electric motor is overheated; and
a battery connected to a side of the cooling line and configured to supply power to said biaxial electric motor;
wherein the cooling line includes a discharge unit having a first end connected to the cooler to guide the oxidant discharged from the cooler; and
wherein a second end of the discharge unit is connected to an outside of the liquid rocket engine, wherein the oxidant leaked from the oxidant pump is heat-exchanged with said biaxial electric motor and the battery and is then discharged to the outside of the liquid rocket engine.

2. The liquid rocket engine of claim 1, further comprising:
a gas generator to generate a high-temperature and high-pressure gas;
an auxiliary oxidant line branched from the main oxidant line between the main combustor and the oxidant pump to guide a part of the oxidant to the gas generator;
an auxiliary fuel line branched from the main fuel line between the main combustor and the fuel pump to guide a part of the fuel to the gas generator; and
a turbine configured to be rotated by the high-temperature and high-pressure gas generated by the gas generator and drive the oxidant pump and the fuel pump.

3. The liquid rocket engine of claim 1, wherein the cooler has a barrel shape to accommodate said biaxial electric motor and a flow path through the barrel shape.

4. The liquid rocket engine of claim 1, wherein the cooler has a coil shape by being wound around an outer circumferential surface of said biaxial electric motor, one end of said coil shape is connected to the second end of the supply unit of the cooling line and an opposite end of said coil shape is connected to the first end of the discharge unit of the cooling line.

5. The liquid rocket engine of claim 1, further comprising:
an igniter connected to the battery, the igniter installed on a side of the main combustor to ignite the main combustor by electric spark.

6. A liquid rocket engine comprising:
a main combustor to receive and combust an oxidant and a fuel;
a main oxidant line to guide the oxidant accommodated in an oxidant tank to the main combustor;
a main fuel line to guide the fuel accommodated in a fuel tank to the main combustor;
an oxidant pump installed at the main oxidant line;
a fuel pump installed at the main fuel line;
an oxidant booster pump installed at the main oxidant line between the oxidant tank and the oxidant pump;
a fuel booster pump installed at the main fuel line between the fuel tank and the fuel pump;
a first electric motor uniaxially connected to the oxidant booster pump to drive the oxidant booster pump;
a second electric motor uniaxially connected to the fuel booster pump to drive the fuel booster pump;
a cooling line having a supply unit connected to the oxidant pump to guide oxidant leaked from the oxidant pump to said first electric motor and said second electric motor;
a pair of coolers connected to the supply unit, a first cooler of the pair of coolers installed at said first electric motor and a second cooler of the pair of coolers installed at said second electric motor;
a cooling line opening/closing valve installed in the supply unit to supply the leaked oxidant to said pair of coolers when said first electric motor or said second electric motor is overheated; and
a battery connected to a side of the cooling line, said battery configured to supply power to said first electric motor and said second electric motor;
wherein the cooling line includes a discharge unit to guide the oxidant discharged from the first cooler and the second cooler; and
wherein the discharge unit is connected to an outside of the liquid rocket engine, wherein the oxidant leaked from the oxidant pump is heat-exchanged with both the first cooler and the second cooler and the battery and is then discharged to the outside of the liquid rocket engine.

7. The liquid rocket engine of claim 6, further comprising:
a gas generator to generate a high-temperature and high-pressure gas;
an auxiliary oxidant line branched from the main oxidant line between the main combustor and the oxidant pump to guide a part of the oxidant to the gas generator;
an auxiliary fuel line branched from the main fuel line between the main combustor and the fuel pump to guide a part of the fuel to the gas generator; and
a turbine configured to be rotated by the high-temperature and high-pressure gas generated by the gas generator and drive the oxidant pump and the fuel pump.

8. The liquid rocket engine of claim 6, wherein the first cooler has a barrel shape to accommodate said first electric motor and the second cooler has a barrel shape to accommodate said second electric motor.

9. The liquid rocket engine of claim 6, wherein the first cooler has a coil shape by being wound around an outer circumferential surface of said first electric motor and the second cooler has a coil shape by being wound around an outer circumferential surface of said second electric motor, one end of said coil shape is connected to the supply unit of the cooling line and an opposite end of said coil shape is connected to the discharge unit of the cooling line.

10. The liquid rocket engine of claim 6, further comprising:
   an igniter connected to the battery, the igniter installed on a side of the main combustor to ignite the main combustor by electric spark.

\* \* \* \* \*